Patented Sept. 3, 1929.

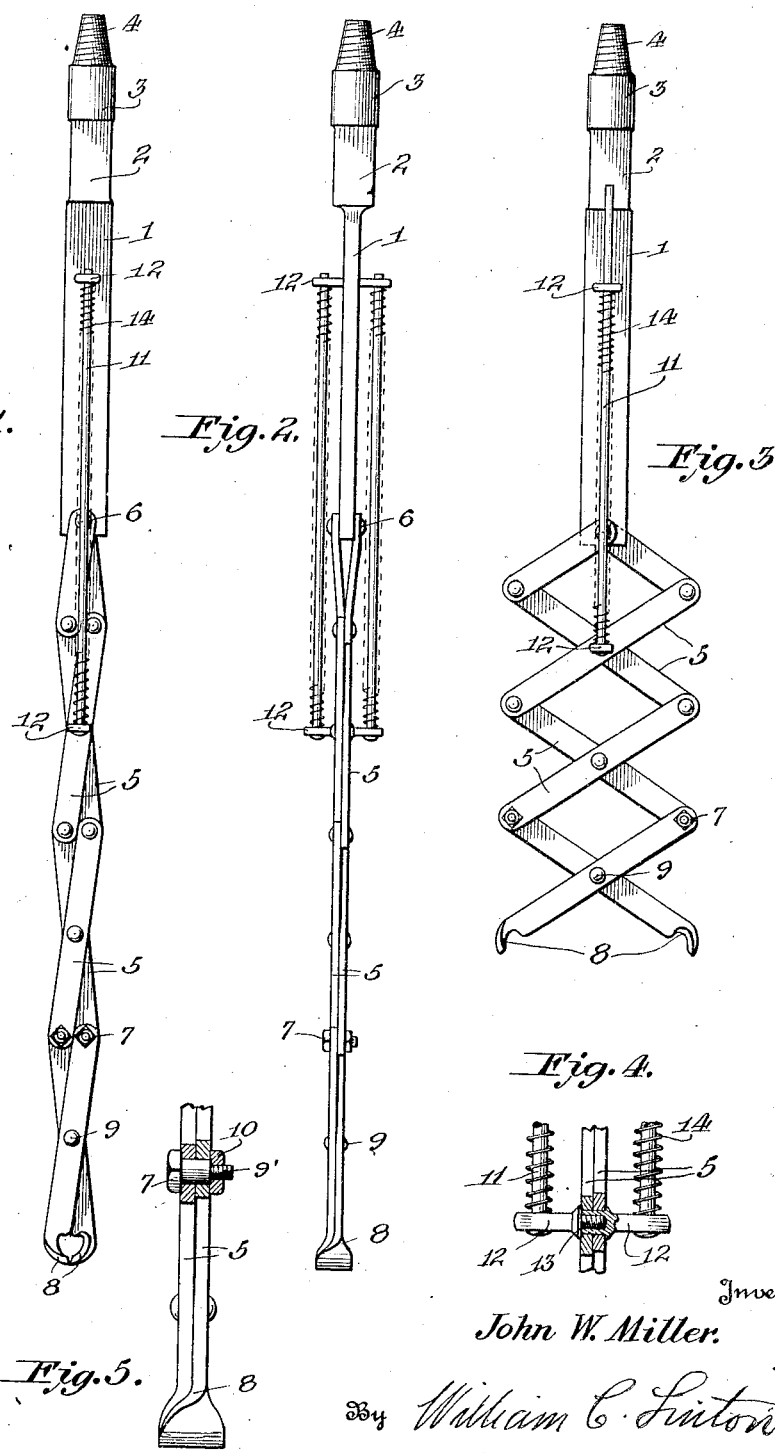

1,727,245

UNITED STATES PATENT OFFICE.

JOHN W. MILLER, OF BROWNWOOD, TEXAS.

FISHING TOOL.

Application filed April 20, 1927. Serial No. 185,261.

This invention relates to improvements in fishing tools for use in connection with gas, oil and artesian well drilling operations, having for an object to provide an automatically operable fishing tool which, when lowered into a well bore will have the grappling means thereof in closed position, but which, with arrangement adjacent a tool or other object to be fixed from said bore, will be caused to move automatically to open position, thus, facilitating an effectual positioning of the fishing tool with respect to such tool or object to be removed, whereupon, with lifting of the device, the grappling means will firmly or positively engage or grip said tool or object and permit it to be successfully withdrawn from the bore.

It is also an object of the invention to provide a fishing tool having means thereon which will permit of the attachment of different forms or types of grappling means thereto, according to the requirements of a tool or object fishing operation to be effected thereby, that is, the shape and size or weight of the object to be removed from the well bore.

The invention also includes amongst its principal desideratums, the provision of a fishing tool having means thereon which will function to prevent any and all binding between the movable or operative parts thereof, hence, insuring effectual and proper operation of the fishing tool, at all times.

Other objects of the invention will be in part obvious and in part pointed out hereinafter.

In order that the invention and its mode of operation may be readily understood by those skilled in the art, I have in the accompanying illustrative drawings and in the detailed following description based thereupon, set out one possible embodiment of the invention.

In these drawings:

Figure 1 is a side elevation of the improved fishing tool showing the grappling means in closed position, Figure 2 is a similar view taken at substantially right angles to the Figure 1, Figure 3 is a side elevation of the fishing tool wherein the grappling means are shown in open position, Figure 4 is an enlarged fragmentary detail, partly in section, showing the specific construction of the means for movably connecting the motion urging means of the fishing tool to the body portion and to the lazy tong construction of the same, and Figure 5 is an enlarged fragmentary detail, partly in section, showing the manner in which a detachable pivotal connection is effected between the lower or free ends of the lazy tong construction and the particular grappling means employed in connection therewith.

Having more particular reference to the drawings, in connection with which like characters of reference will designate corresponding parts throughout, the improved fishing tool may be stated to comprehend an elongated and substantially flat body portion of metal or other suitable material, indicated at this time by the numeral 1, the upper portion of said body being enlarged and substantially square in cross section as indicated by the numeral 2, whereas another and cylindrical extension 3 is formed upon the upper or free end of the portion 2 and carries thereon a frusto conical screw threaded extension 4 whereby the body portion of the fishing tool may be connected to the usual operating or carrying stem. At this point, notation should be made of the fact that the cross sectional area of the cylindrical extension 3 slightly exceeds that of the squared extension 2 and consequently thereupon, it will be understood that the peripheral surfaces of this cylindrical extension 3 will serve, more or less, as a bearing surface for the tool, ensuring its retention, during lowering into a well bore and removal from said bore, in a perpendicular or substantially perpendicular position.

A lazy tong construction, consisting of the usual crossed and intermediately pivoted levers, generally indicated herein by the numeral 5 is pivoted to the lower end of the body portion 1 as indicated at 6, a rivet, bolt or other suitable device serving to effect this pivotal connection, while the free or lower ends of the levers of the lazy tong construction are provided with suitable openings adapted to receive attaching bolts 7 therethrough, said bolts in turn, affording means for pivotally connecting the upper ends of grappling devices 8 thereto, such grappling devices having their intermediate portions crossed and pivotally interconnected as at 9.

The bolts 7 employed for effecting pivotal connection of the grappling means 8 to the lower ends of the levers of the lazy tong construction are preferably formed of lengths approximately corresponding to the combined thickness of the lazy tong levers and the grappling devices 8, while a cross sectionally reduced and screw threaded cylindrical extension 9' is formed upon the free end of the bolt shanks and upon each of these extensions, the usual locking nuts 10 are adapted to be passed, the inner portions of the bolts having abutting engagement with the shouldered portions of the bolt shanks and thus being limited in their inward movement upon said bolt shanks, consequently, preventing any binding whatsoever as between the parts pivotally interconnected thereby and therefore, avoiding all possibility of binding of the same which might otherwise interfere with their free relative pivotal movement. Obviously, by reason of the connection of the grappling devices 8 to the lower ends of the levers of the lazy tong construction 5, such grappling devices may be readily detached therefrom and if desired, grappling devices having jaws of different sizes, formation or type may be substituted therefor, such as conditions or preference may dictate.

That an automatic motion urging means may be provided the lazy tong construction 5 in order that such construction will be normally urged to its closed position whereat the gripping jaws of the grappling devices 8 will be correspondingly arranged, a pair of rods 11 are arranged longitudinally of and adjacent the opposite sides of the flattened body portion 1; the lower ends of these rods being engaged through openings or eyes formed in the outer ends of screw bolts 12. One of these screw bolts as will be noted upon reference to the Figure 4 has an internally screw threaded slot formed longitudinally of the shanks thereof, whereas the shank portion of the remaining bolt is of a cross sectional size such as will permit of its snug engagement in said socket of the first mentioned bolt and is also exteriorly screw threaded as indicated at 13, thus permitting of the turning of the shank of this last mentioned screw bolt into engagement with the internally screw threaded socket portion of the shank of the remaining screw bolt. Thus, with engagement of the socket carrying shank of the screw bolt 12 through the aligned and intermediately arranged pivot openings of the adjacent levers of the lazy tong construction 5, an effectual intermediate pivoting of such levers will result, while to prevent this engagement of this particular screw bolt 12 from said pivot openings, the shank portion of the remaining bolt 12 is turned into engagement with the same. Consequently upon this connection, it will be understood, especially upon reference to the Figures 2 and 4 that opposed means are provided upon the opposite sides of the lazy tong construction 5 and that these means serve to permit of connection of the lower ends of the rods 11 therethrough.

Having so connected the lower ends of the rods 11 to the lazy tong construction 5, expansible coil springs 14 are arranged thereover for portions of their respective lengths, while the free or remaining portions of said rods are slidably engaged through the eyes of other screw bolts 12' and these particular bolts are constructed in a manner corresponding to the construction of the aforesaid bolts 12 but being engaged through an opening formed in the upper portion of the flattened body 1 as is shown in the Figure 2. Through the slidable engagement of the upper ends of the rods 11 in the eyes of the screw bolts 12', it will be understood that the expansible coil spring 14 will be confined against material longitudinal movement upon their respective rods and furthermore, that with pivotal movement of the lazy tong construction to a position whereat the grappling devices 8 will be in their open positions said spring 14 will be compressed and tensioned in the manner as is illustrated in the Figure 3. When so tensioned, the coil spring 14 will serve as an automatic urge, tending to return the lazy tong construction 5 and the grappling devices 8 connected thereto to relative closed positions, as is illustrated in the Figures 1 and 2. Also, by reason of the engagement of the lower ends of the rods 11 in the eye bolts 12 and the slidable engagement of the upper ends of said rods in the eye bolts 12', it will be understood that any pivotal or swinging movement as between the lazy tong construction 5 and the body portion 1 will be prevented from causing said rods 11 to have binding engagement with the screw bolts 12' inasmuch as such screw bolts will be permitted to rotate with respect to that portion of the body 1 receiving them and likewise, that the screw bolts 12 will also be permitted to rotate with respect to those particular portions of the lazy tong levers receiving them.

In operation of my improved fishing tool, connection is made between the same and the usual drill stem or other device, whereupon the fishing tool is lowered into the well bore. As the grappling devices 8 carried upon the lazy tong construction 5 of the fishing tool contact with a tool or other object to be removed from the well bore, an upwardly directed pressure will be brought to bear upon the said lazy tong construction 5 and consequently thereupon, together with the application of the weight of the body portion 1 to said object, the levers of the lazy tong construction will have pivotal movement and thereby, will be moved to their abnormal or open positions, hence, effecting movement of the grappling devices 8 to their respective open positions as is shown in the Figure 3. The tool is now properly positioned with respect to the object or tool to be removed from the well bore, immediately following which the fishing tool is lifted through the well bore, whereupon the now compressed coil springs 14 will impart a downward thrust to the lazy tong construction 5, hence causing the grappling devices 8 carried thereby to be moved to closed positions and consequently, to firmly and positively engage with the particular tool or other object to be withdrawn from the well bore. The fishing tool may be now fully removed from the well bore and then operated to effect opening of the grappling devices 8 and release of the object removed from the well bore.

Manifestly, the construction shown is capable of considerable modification and such modification as is within the spirit of my claims, I consider within the scope of my invention.

I claim:

1. A fishing tool comprising a body portion, attaching means on the upper end of said body portion, a lazy tong construction pivotally connected to the lower end of the body portion, grapples having their intermediate portions crossed and pivotally connected to the lower end of such lazy tong construction, a pair of rods disposed longitudinally of the lazy tong construction and the body portion, the lower ends of these rods having pivotal connection with said lazy tong construction adjacent the opposite sides thereof, spring means arranged upon said rods and the upper portion of said rods having slidable engagement with the body portion.

2. A fishing tool comprising a body portion, a lazy tong construction pivoted to the lower end thereof to hang below said body portion, attaching means carried upon the upper end of the body portion, relatively crossed and pivoted grapples detachably pivoted to the lower ends of said lazy tong construction, interconnected screw bolts passed through portions of the levers of the lazy tong construction and serving as a pivot therefor, said bolts capable of having rotary movement with respect to said levers of the lazy tong construction, rods connected at their lower ends to the extremities of said bolts and arranged upon the opposite sides of the body portion longitudinally thereof, other screw bolts pivotally engaged with the upper end of said body portion and slidably receiving said rods therethrough and spring means arranged upon said rods between said screw bolts.

3. A fishing tool comprising a body portion having an enlarged cylindrical extension on the upper end thereof, attaching means carried by said extension, the lower portion of said body being substantially flattened, a lazy tong construction pivoted to the lower end of said flattened portion of the body to hang below said body portion, relatively crossed and pivotally connected grapples detachably pivoted to the lower ends of said lazy tong construction, telescopically engaged and interconnected screw bolts received in the pivot openings of certain of the levers of said lazy tong construction and capable of rotative movement with respect thereto, a pair of longitudinally disposed rods connected at their lower ends to said screw bolts and arranged upon and disposed longitudinally of the opposite sides of said flattened body portion, other telescopically engaged and interconnected screw bolts passed through the upper portion of said body portion and rotatable with respect thereto, the upper portions of said rods being slidably received by said second mentioned screw bolts and spring means carried upon said rod and arranged between said first and second mentioned screw bolts.

4. A fishing tool comprising a body portion adapted for connection to an operating stem, a lazy tong structure pivoted to the lower end of said body portion to hang therebelow and have free movement relative thereto, guide elements carried by said body portion, rods connected to said structure and slidably mounted in said guide elements and coil springs encircling said rods and having abutting engagement with said structure and with said guide elements.

In witness whereof I have hereunto set my hand.

JNO. W. MILLER.